(12) United States Patent
Wakahoi et al.

(10) Patent No.: US 6,602,632 B2
(45) Date of Patent: Aug. 5, 2003

(54) SEALING MEMBER FOR FUEL CELL

(75) Inventors: Toshiya Wakahoi, Wako (JP); Hiroyuki Tanaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/013,192

(22) Filed: Nov. 5, 2001

(65) Prior Publication Data

US 2002/0055032 A1 May 9, 2002

(30) Foreign Application Priority Data

Nov. 6, 2000 (JP) .................................... P2000-338037

(51) Int. Cl.[7] .............................................. H01M 2/08
(52) U.S. Cl. ........................................ 429/35; 429/34
(58) Field of Search ............................. 429/34, 35, 38, 429/39

(56) References Cited

U.S. PATENT DOCUMENTS

| | | | | |
|---|---|---|---|---|
| 6,057,054 A | * | 5/2000 | Barton et al. | 429/34 |
| 6,261,711 B1 | * | 7/2001 | Matlock et al. | 429/34 |
| 6,338,492 B1 | * | 1/2002 | Schilling et al. | 429/35 |
| 6,387,557 B1 | * | 5/2002 | Krasij et al. | 429/39 |
| 6,399,234 B2 | * | 6/2002 | Bonk et al. | 429/38 |
| 6,423,439 B1 | * | 7/2002 | Barton et al. | 429/38 |
| 6,440,597 B1 | * | 8/2002 | Mizuno | 429/34 |
| 6,451,469 B1 | * | 9/2002 | Nakamura et al. | 429/38 |
| 6,495,280 B2 | * | 12/2002 | Morrow et al. | 429/35 |
| 6,500,580 B1 | * | 12/2002 | Marvin et al. | 429/39 |

FOREIGN PATENT DOCUMENTS

JP    8-037012    2/1996

* cited by examiner

Primary Examiner—Bruce F. Bell
(74) Attorney, Agent, or Firm—Lahive & Cockfield, LLP (57) ABSTRACT

The present invention is to provide a sealing member for a fuel cell which is able to keep surface pressure low, and to enhance sealing performance. The fuel cell includes an anode electrode and a cathode electrode which are sandwiched on both sides of a solid polymer electrolyte membrane, and an anode side separator and a cathode side separator which are then layered against both sides of this combination. Sealing members are installed into grooves on these separators. The cross section of each sealing member is formed with projecting portions extending in the widthwise direction of its groove on both sides of a semicircular shaped sealing member main body, and with a pair of cutaway portions in positions symmetrical about the center of a chord portion of the sealing member main body.

5 Claims, 9 Drawing Sheets

SEALING MEMBER FOR FUEL CELL

BACKGROUND OF THE INVENTION

1. Field of the Invention

The present invention relates to a sealing member for a fuel cell, and more particularly relates to the sealing member which can enhance sealing performance.

2. Description of the Related Art

There is a per se known type of solid polymer electrolyte type fuel cell which has been developed, in which a plurality of fuel cell units are layered together, each fuel cell unit including a solid polymer electrolyte membrane with an anode electrode and a cathode electrode sandwiching it from its opposing sides, and with a pair of separators sandwiching this membrane electrode assembly having aforementioned structure from both its sides, the whole being secured together into a unit. These fuel cells are effective for various uses.

With these types of fuel cell, fuel gas—for example, hydrogen gas—is supplied to the anode electrode side, and is converted into hydrogen ions by an electrode catalyst, and then moves towards the cathode electrode via the solid polymer electrolyte membrane which is appropriately humidified. The electrons which are generated at the anode are emitted to an external circuit, and are used as DC electrical energy. An oxidizing gas, for example oxygen gas or air, is supplied to the cathode electrode, so that these hydrogen ions, this oxygen gas, and these electrons are reacted together at this cathode electrode to generate water.

Moreover, gas-tightness is ensured by the provision of sealing members between separators which are provided on both sides of the membrane electrode assembly, in order for this fuel gas and oxidizing gas which are supplied to the anode electrode and the cathode electrode not to leak to the outside, and it is arranged for the fuel gas and the oxidizing gas to be conducted to the reaction surfaces, which are the portions of these separators which are introduced by the sealing members.

Furthermore, in order to prevent rise of the temperature of the fuel cell due to the reaction between the fuel gas and the oxidizing gas, a coolant fluid is supplied to between neighboring ones of the separators when the fuel cell units are layered together, and sealing members are provided for preventing leaking out of the coolant fluid to the exterior around the peripheries of the cooling surfaces of the separators, as well.

In addition, when supplying the reaction gases such as fuel gas and oxidizing gas to the anode electrode and to the cathode electrode, and supplying coolant fluid to the cooling surfaces, if an internal manifold structure is used reaction gas supply holes (or openings)and coolant supply holes are formed to penetrate through each separator, it is furthermore necessary to seal the periphery of each supply hole with a sealing member.

Figure 11:
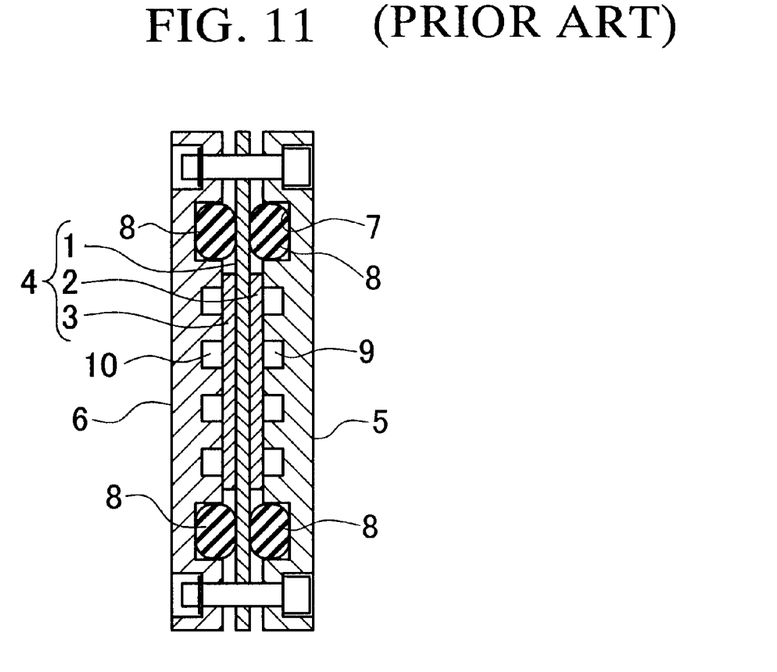
FIG. 11 is a sectional view of an example of the conventional fuel cell.

An example of a prior art such sealing member which surrounds the reaction surfaces will now be explained with reference to FIG. 11. In FIG. 11, reference numeral 1 denotes the solid polymer electrolyte membrane, and this solid polymer electrolyte membrane 1 is sandwiched between an anode electrode 2 and a cathode electrode 3, to constitute a membrane electrode assembly 4. This membrane electrode assembly 4 is further sandwiched between a pair of separators 5 and 6 on both its sides, and constituting the fuel cell.

The periphery of the solid polymer electrolyte membrane 1 extends further outwards than the peripheral edge portions of the electrodes 2 and 3, and this projecting edge portion is sandwiched on both its sides by sealing members 8 which are fitted into grooves 7 formed upon the inwardly facing surfaces of the separators 5 and 6. And reaction gas conduits 9 and 10 are formed in the surfaces of the separators 5 and 6 which face the electrodes 2 and 3.

Accordingly, fuel gas and oxidizing gas are respectively supplied to the reaction gas conduits 9 and 10 defined between the electrodes 2 and 3 and the separators 5 and 6 which are surrounded by the above described sealing members 8, and the sealing members 8 ensures that these reaction gases do not escape to the outside. This matter is disclosed in Japanese Patent Application, First Publication No. Hei 8-37012.

However, with the sealing member for a fuel cell according to the above describer prior art, when the sealing member 8 is affixed by being pushed into the groove 7 until the width of the groove 7 is filled, and the separators 5 and 6 are fitted to both sides of the membrane electrode assembly 4 and are fastened thereagainst by being clamped, since there is no space into which the deformed sealing member can be released, a great fastening force for the clamping mechanism is necessary, and the surface pressure upon the sealing member 8 becomes great. Accordingly, the problem arises that a clamping mechanism of relatively great size and weight is required for ensuring a sufficiently great clamping force, when a plurality of these fuel cell units are layered together into a fuel cell assembly.

Figure 12:
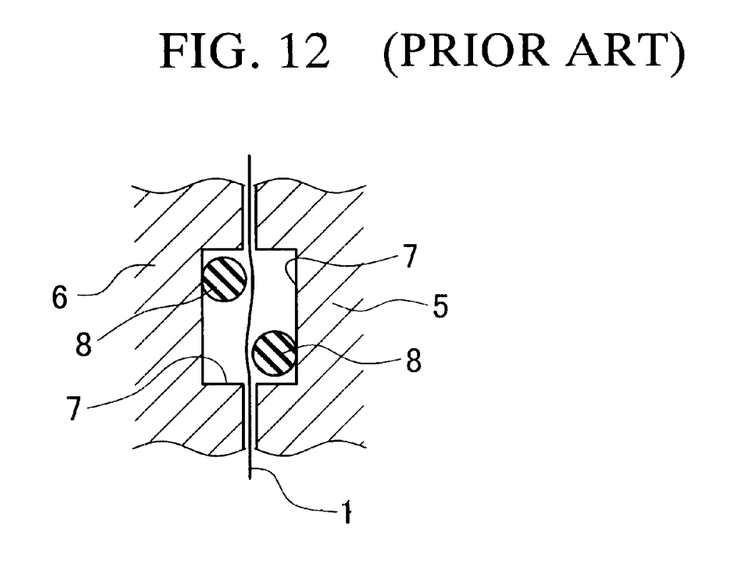
FIG. 12 is an explanatory partial sectional view of the fuel cell of FIG. 11.

By contrast, it would also be possible to make the width of the groove 7 relatively large with respect to the diameter of the sealing member 8 which is to be used, and to fit the sealing member 8 into the groove 7 with a degree of extra space being left available. However, if this is done, when the separators 5 and 6 are clamped against the membrane electrode assembly 4 from both its sides, positional deviation or slippage of the sealing members 8 in the grooves 7 of the separators can easily occur, as shown in FIG. 12, and thus the problem arises that it is not possible to ensure a reliable seal between the separators 5 and 6 and the solid polymer electrolyte membrane 1, due to the shearing force which can deform the solid polymer electrolyte membrane 1.

SUMMARY OF THE INVENTION

It is the objective of the present invention to provide a sealing member for a fuel cell, with which it is possible to keep the surface pressure which is applied to the sealing member low, thus making it possible to enhance the sealing performance.

In order to achieve the above described objective, the first aspect of the present invention proposes a sealing member (for example, in the disclosed embodiment, the sealing members S1 and S2) for a fuel cell which comprises a pair of electrodes (for example, in the disclosed embodiment, the anode electrode A and the cathode electrode C) which sandwich an electrolyte membrane (for example, in the disclosed embodiment, the solid polymer electrolyte membrane 15) on both its sides, and a pair of separators (for example, in the disclosed embodiment, the anode side separator 13 and the cathode side separator 14) which sandwich the electrolyte membrane on both its outer sides. The sealing member installed into a groove (for example, in the disclosed embodiment, the grooves 38 and 39) in each separators, and characterized by being formed, in cross section, with a pair of cutaway portions (for example, in the disclosed embodiment, the cutaway portions 43) in symmetrical positions with respect to the center of a chord portion (for example, in the disclosed embodiment, the chord portion 40b) of a generally semicircular shaped sealing member main body (for example, in the disclosed embodiment, the sealing member main body 40).

According to the sealing member having this structure, when pressure acts from the arcuate portion (for example, in the disclosed preferred embodiment, the arcuate portion 40a) which opposes the chord portion of the sealing member main body, the portion between said pair of cutaway portions becomes a sealing surface (for example, in the disclosed preferred embodiment, the bottom portion 40c), and it is possible to enhance the sealing performance. Furthermore, it is possible to ensure a relatively large amount of elastic deformation of the sealing member main body with a relatively small amount of pressure, since it is possible to release the portions which have been deformed by the pressure into the void portions (for example, in the disclosed preferred embodiment, the void portions 45) which are defined between the groove and the cutaway portions. Accordingly, if a plurality of these fuel cells are layered together into a single assembly, it is possible to reduce the overall force which is required for clamping them together as compared with the prior art, and thus it is possible to reduce the overall size and weight of the clamping structure.

The second aspect of the present invention proposes the sealing member as described above, further characterized in that projecting portions (for example, in the disclosed embodiment, the projecting portions 42) are provided on both sides of the chord portion extending in the widthwise direction of the groove, and the projecting portions extend to positions which adjoin or contact side walls (for example, in the disclosed embodiment, the side walls 38a and 39a) of the groove.

According to the sealing member having this structure, it is possible to position the central portion of the chord portion at the central portion of the groove in its widthwise direction, and it is possible to ensure that no slippage occurs in the widthwise direction of the groove, since the movement of the ends of these projecting portions which are provided as extending in the widthwise direction of the groove are prevented by the side walls of the groove.

And the third aspect of the present invention proposes the sealing member as described above, further characterized in that cutaway portions (for example, in the disclosed embodiment, the cutaway portions 44) are formed upon the projecting portions at predetermined intervals in the lengthwise direction of the groove.

According to the sealing member having this structure, when pressure acts upon the arcuate portion, it is possible to ensure a relatively great amount of elastic deformation, since it is possible to release the portions which are deformed into the void portions (for example, in the disclosed preferred embodiment, the void portions 45) which are defined between the side walls of the groove and the cutaway portions. Moreover, the ease of working when inserting the sealing member into the groove is enhanced, because the area of the projection portion which contacts the groove is reduced.

DESCRIPTION OF THE PREFERRED EMBODIMENTS

Several preferred embodiments of the present invention will now be described with reference to the drawings.

Figure 1:
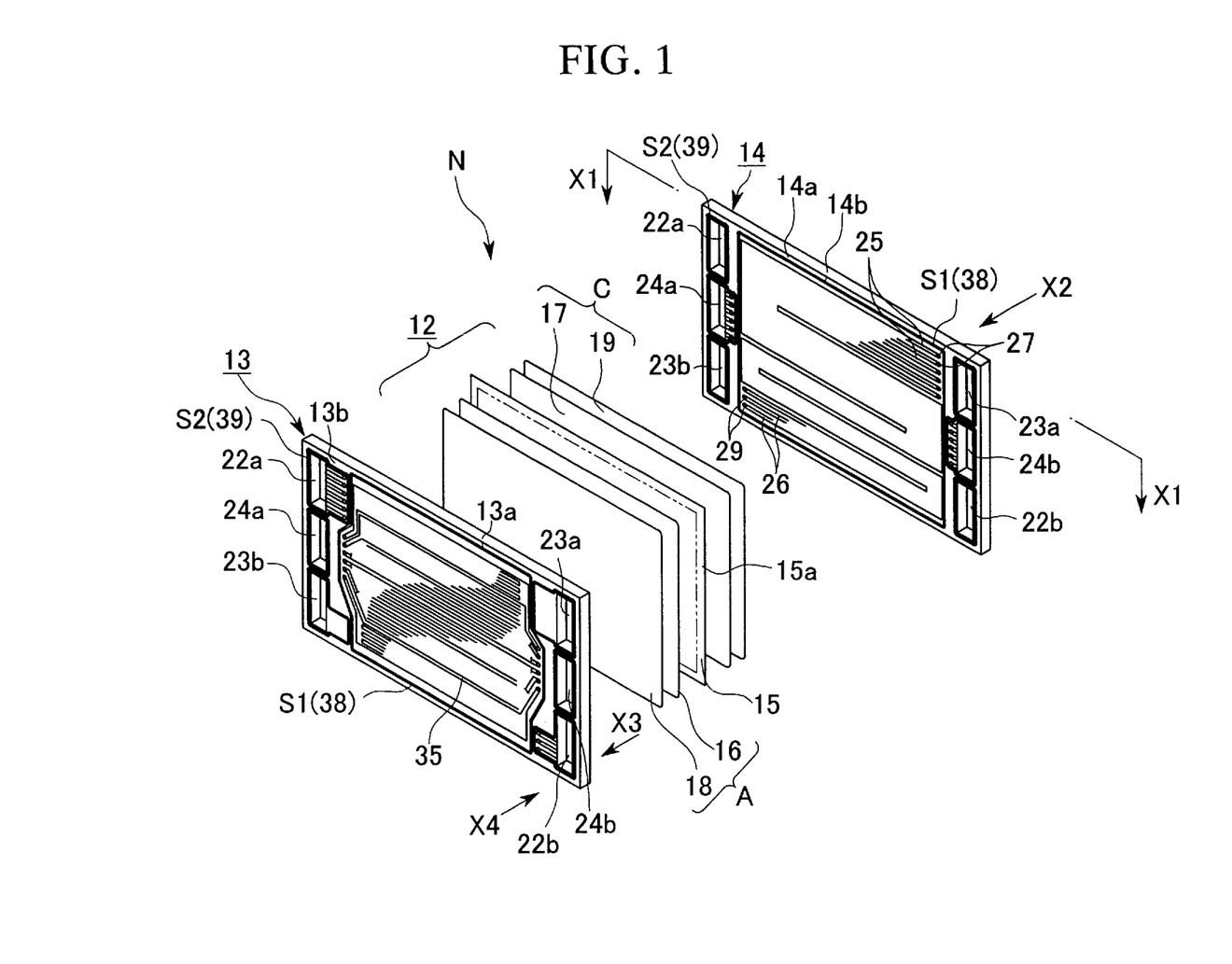
FIG. 1 is an exploded perspective view of a fuel cell which incorporates a sealing member according to a preferred embodiment of the present invention.
Figure 2:
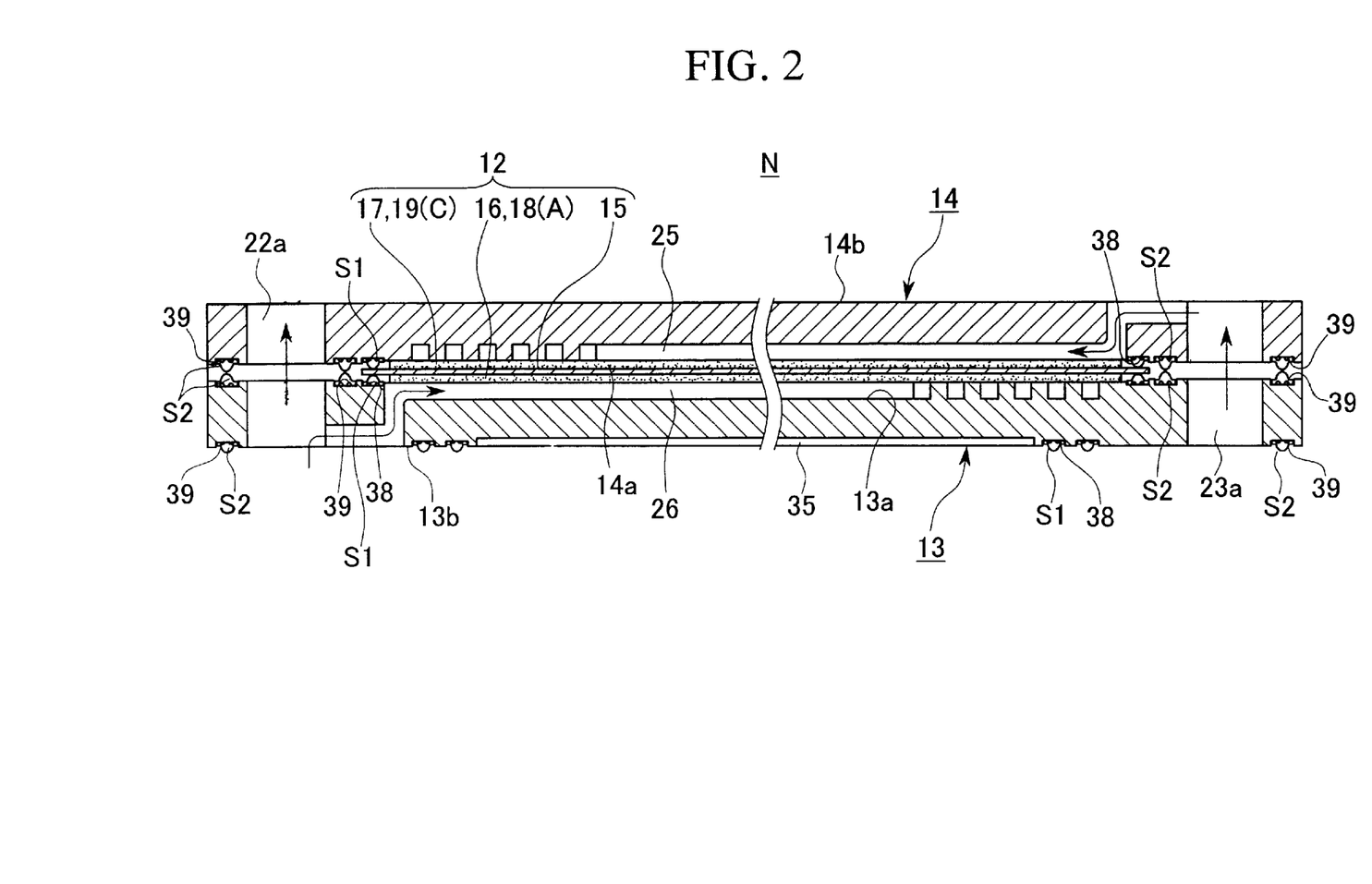
FIG. 2 is a sectional view of the fuel cell of FIG. 1 in its assembled state, taken in a sectional plane shown by the arrows X1—X1.

FIG. 1 is an exploded perspective view showing a fuel cell which incorporates a sealing member according to a preferred embodiment of the present invention, and FIG. 2 is a sectional view of the fuel cell of FIG. 1 in its assembled state, taken in a sectional plane shown by the arrows X1—X1. In FIGS. 1 and 2, a fuel cell N comprises a fuel cell unit which is composed of a membrane electrode assembly 12, and an anode side separator 13 and a cathode side separator 14 which are provided on both the sides of said assembly 12 so as to sandwich it, and a plurality of fuel cell units are layered and fixed together by a fixing structure consisting, for example, of bolts and nuts, so as to constitute a fuel cell stack for use in a vehicle.

This membrane electrode assembly 12 comprises a solid polymer electrolyte membrane 15, and an anode side electrode catalytic layer 16 and a cathode side electrode catalytic layer 17 provided on both the sides of this solid polymer electrolyte membrane 15 so as to sandwich it. Furthermore, on the outsides of both the anode side electrode catalytic layer 16 and the cathode side electrode catalytic layer 17, there are provided an anode side porous conductor 18 and a cathode side porous conductor 19.

The above described anode side porous conductor 18 and cathode side porous conductor 19, for example, may be made from porous carbon paper, porous carbon cloth, or porous carbon felt. Furthermore, a perfluorosulphonic acid polymer may be used for the solid polymer electrolyte membrane 15. On the other hand, the anode side electrode catalytic layer 16 and the cathode side electrode catalytic layer 17 are mainly made from platinum. It should be understood that the above described anode side electrode catalytic layer 16 and anode side porous conductor 18 together constitute an anode electrode A, while the above described cathode side electrode catalytic layer 17 and cathode side porous conductor 19 together constitute a cathode electrode C.

To the solid polymer electrolyte membrane 15, there is provided a projecting portion 15a which extends all around its outer peripheral edge and projects outwards from the outer peripheral edge portions of the anode electrode A and cathode electrode C which face it on either side so as to sandwich it. Furthermore, an anode side sealing member S1 and a cathode side sealing member S1 which will be described hereinafter are directly and tightly contacted against this projecting portion 15a from both sides.

As shown in FIG. 1, the cathode side separator 14 comprises, on its outer circumferential edge portion at opposing upper side positions on both sides in the horizontal direction as seen in the figure, an inlet side fuel gas through hole 22a for passing a fuel gas such as a gas containing hydrogen or the like, and an inlet side oxidizing gas through hole 23a for passing an oxidizing gas which may be a gas containing oxygen or simply air. Moreover, in the cathode side separator 14 there are provided, on its outer circumferential edge portion at opposing middle side positions on both sides in the horizontal direction as seen in the figure, an inlet side cooling medium through hole 24a for passing in a cooling medium such as pure water or ethylene glycol or oil, and an outlet side cooling medium through hole 24b for passing out said cooling medium after it has been used. Furthermore, in the cathode side separator 14 there are provided, on its outer circumferential edge portion at opposing lower side positions on both sides in the horizontal direction as seen in the figure, an outlet side fuel gas through hole 22b for passing out said fuel gas after it has been used, and an outlet side oxidizing gas through hole 23b for passing out said oxidizing gas after it has been used, in positions diagonally opposing to the inlet side fuel gas through hole 22a and the inlet side oxidizing gas through hole 23a, respectively.

In the surface 14a of the cathode side separator 14 which faces the cathode electrode C, there are provided a plurality of independent oxidizing gas flow grooves 25—for example, six thereof—which communicate the inlet side oxidizing gas through hole 23a, and which extend in the vertical direction while meandering in the horizontal direction. These oxidizing gas flow grooves 25 merge together into three oxidizing gas flow grooves 26, and these three oxidizing gas flow grooves 26 terminate by closely approaching to the outlet side oxidizing gas through hole 23b.

Figure 3:
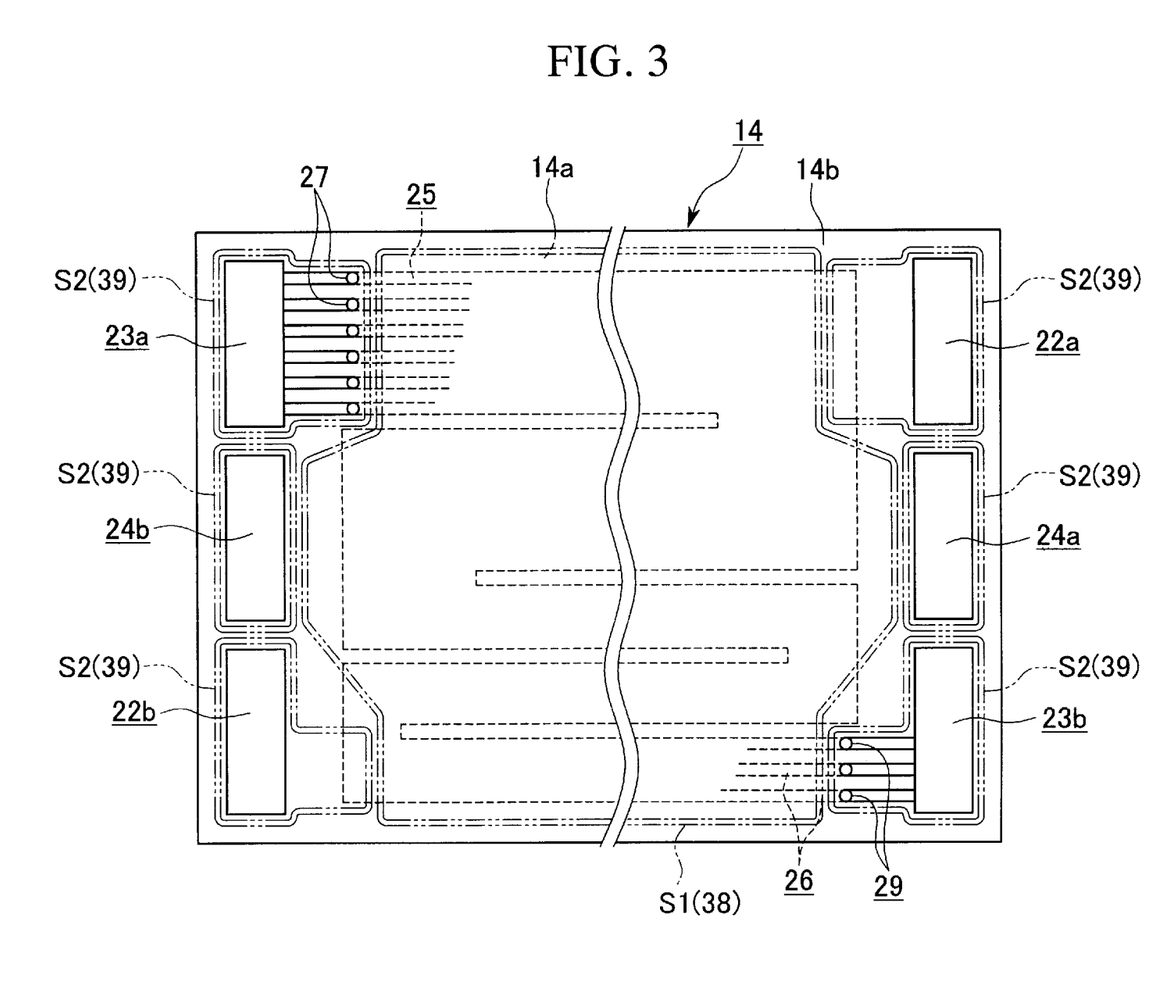
FIG. 3 is a view of the fuel cell of FIG. 1 as seen in the direction of the arrow X2.

As shown in FIG. 3, on the cathode side separator 14 there are provided, penetrating through the cathode side separator 14, oxidizing gas communication conduits 27 of which the one ends are connected to the inlet side oxidizing gas through hole 23a upon the surface 14b which is opposing to the surface 14a while their other ends are connected to the oxidizing gas flow grooves 25 upon said surface 14a. Similarly, on the cathode side separator 14 there is provided, piercing through the cathode side separator 14, oxidizing gas communication conduits 29 of which the one ends are connected to the outlet side oxidizing gas through hole 23b upon said surface 14b while their other ends are connected to the oxidizing gas flow grooves 26 upon said surface 14a.

Figure 4:
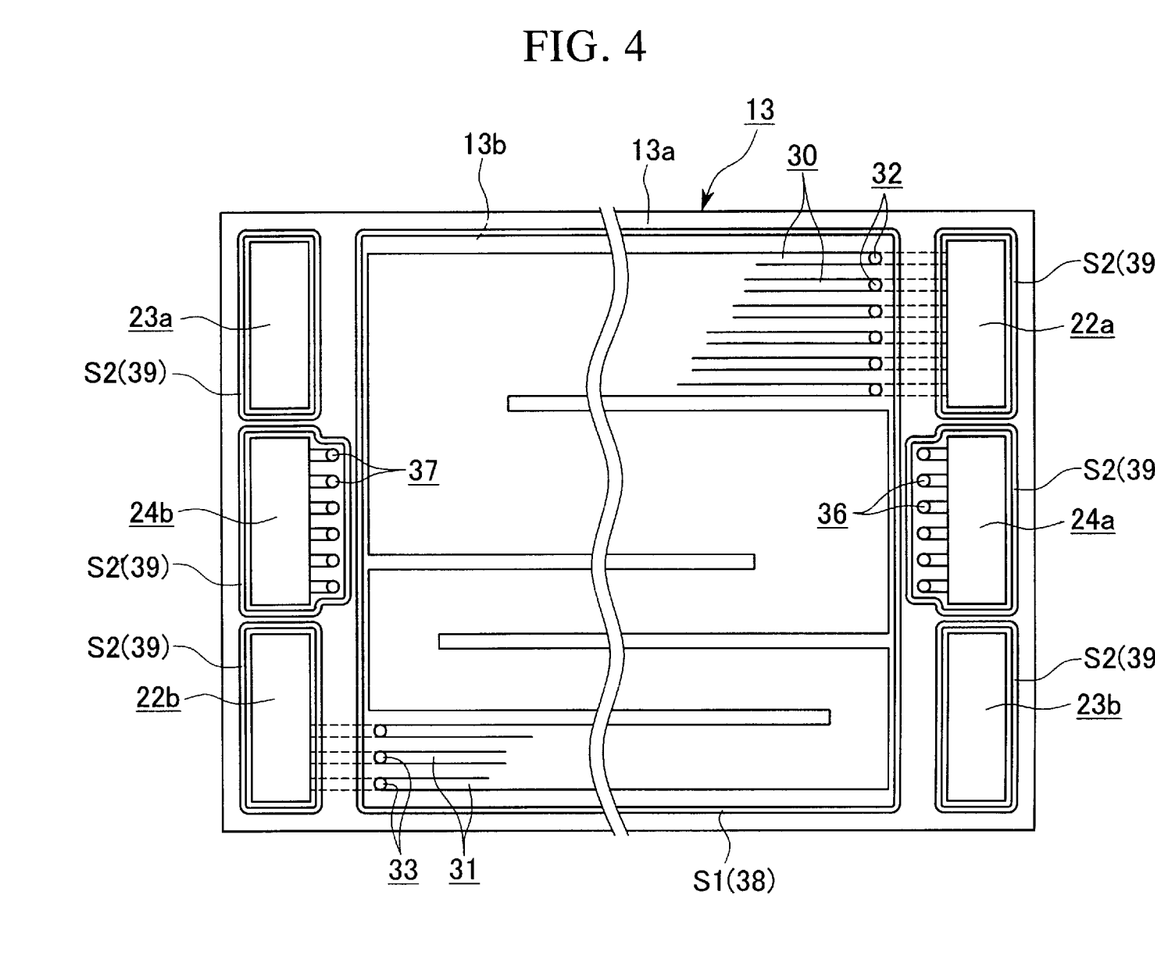
FIG. 4 is a view of the fuel cell of FIG. 1 as seen in the direction of the arrow X3.
Figure 5:
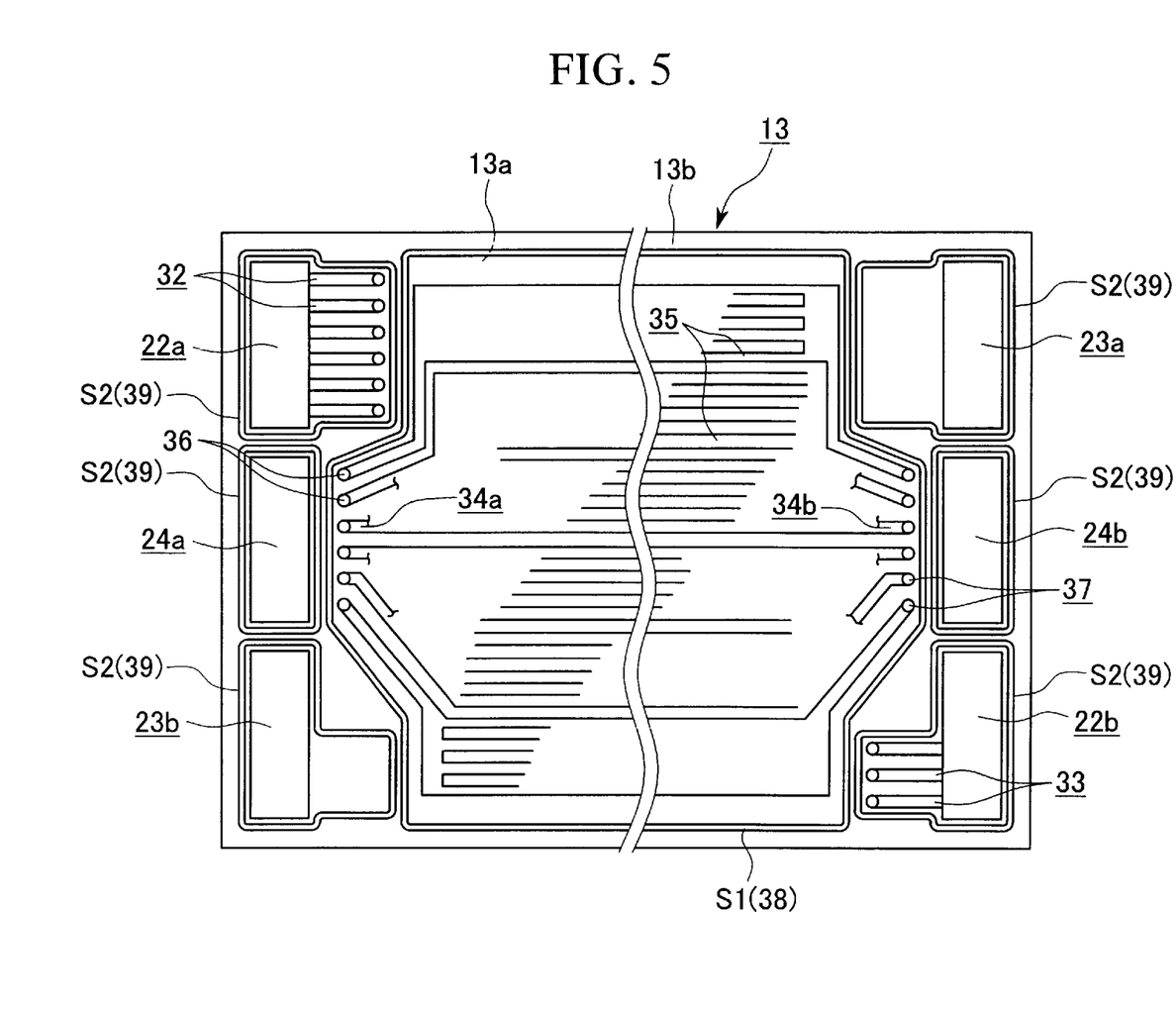
FIG. 5 is a view of the fuel cell of FIG. 1 as seen in the direction of the arrow X4.

As shown in FIGS. 4 and 5, similar to the case of the cathode side separator 14, there are formed, passing through the surface of the anode side separator 13 and positioned in its outer peripheral edge portion at both opposing ends in the horizontal direction, an inlet side fuel gas through hole 22a, an inlet side oxidizing gas through hole 23a, an inlet side cooling medium through hole 24a, an outlet side cooling medium through hole 24b, an outlet side fuel gas through hole 22b, and an outlet side oxidizing gas through hole 23b.

As shown in FIG. 4, in the surface 13a of the anode side separator 13 which faces the anode electrode A, there are formed a plurality of fuel gas flow grooves 30—for example, six thereof—which closely approach the inlet side fuel gas through hole 22a. These fuel gas flow grooves 30 extend in the vertical direction while meandering in the horizontal direction, and merge together into three fuel gas flow grooves 31, with these three fuel gas flow grooves 31 terminating by closely approaching to the outlet side fuel gas through hole 22b.

Moreover, in this anode side separator 13 there are provided, piercing through said anode side separator 13, fuel gas communication conduits 32 which communicate the inlet side fuel gas through hole 22a from the side of the surface 13b to the fuel gas flow grooves 30. Similarly, in this anode side separator 13 there are provided, piercing through said anode side separator 13, fuel gas communication conduits 33 which communicate the outlet side fuel gas through hole 22b from the side of said surface 13b to the fuel gas flow grooves 31.

As shown in FIG. 5, upon the surface 13b of the anode side separator 13 there are formed a plurality of main flow grooves 34a and 34b which approach close to the inlet side cooling medium through hole 24a and close to the outlet side cooling medium through hole 24b, respectively. Between the main flow grooves 34a and 34b there are provided a plurality of branching flow grooves 35 which branch off therefrom and which extend in the horizontal direction as seen in the figure.

Piercing through the anode side separator 13, there are formed cooling medium communication conduits 36 which connect the inlet side cooling medium through hole 24a and the main flow grooves 34a, and cooling medium communication conduits 37 which connect the outlet side cooling medium through hole 24b and the main flow grooves 34b.

As shown in FIG. 4, upon the surface 13a of the anode side separator 13 there is provided a groove 38 which is just outside the peripheral portion of the anode electrode A and which faces the solid polymer electrolyte membrane 15 in a position which opposes the projecting portion 15a thereof, and a sealing member S1 is fitted in this groove 38. Furthermore, grooves 39 are formed upon this face 13a of this anode side separator 13, one of which surrounds each of the inlet side fuel gas through hole 22a, the inlet side oxidizing gas through hole 23a, the inlet side cooling medium through hole 24a, the outlet side cooling medium through hole 24b, the outlet side fuel gas through hole 22b, and the outlet side oxidizing gas through hole 23b; and sealing members S2 are fitted in these grooves 39. These sealing members S2 will be described hereinafter.

As shown in FIG. 4, the grooves 39 upon the surface 13a of the anode side separator 13 which surround the inlet side cooling medium through hole 24a and the outlet side cooling medium through hole 24b are also respectively formed so as to surround the cooling medium communication conduits 36 and the cooling medium communication conduits 37. Furthermore, as shown in FIG. 1, in positions facing the grooves 38 and 39 of the surface 13a of the anode side separator 13, further grooves 38 and 39 are formed upon the surface 14a, which opposes the outer peripheral portion of the cathode electrode C, of the cathode side separator 14 which, together with the anode side separator 13, sandwiches the membrane electrode assembly 12; and respective sealing members S1 and S2 are fitted into these grooves 38 and 39.

Figure 6:
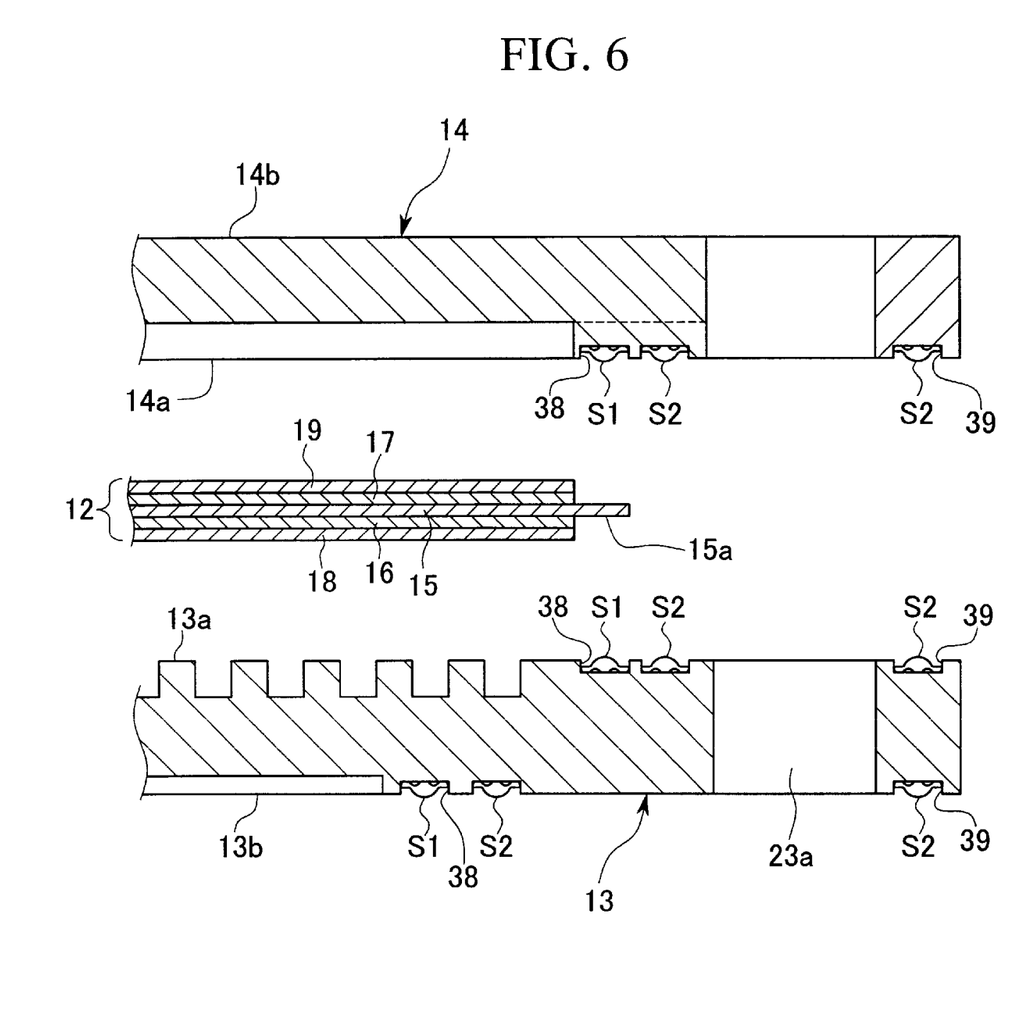
FIG. 6 is an enlarged schematic view of essential portions of FIG. 2.

Accordingly, as shown in FIGS. 2 and 6, the sealing members S1, which are fitted into the grooves 38 formed upon the anode side separator 13 and the cathode side separator 14 which together sandwich the membrane electrode assembly 12 on both its sides, seal the periphery of the membrane electrode assembly 12 by directly contacting tightly against the projecting portion 15 of the solid polymer electrolyte membrane 15 and sandwiching it from both its sides. Furthermore, around the peripheries of the various through holes 22a, 22b, 23a, 23b, 24a, and 24b, each of the respective sealing members S2 is tightly fitted so as to form a peripheral seal therearound.

In addition, as shown in FIGS. 5 and 6, in the surface 13b of the anode side separator 13, there is provided a groove 38 in a position which surrounds the periphery of the branching flow grooves 35, which is a position which opposes the surface 14b of the mutually neighboring cathode side separator 14 when a plurality of these fuel cells N are layered together; and a sealing member S1 is fitted into this groove 38. Furthermore, grooves 39 are formed upon this face 13b of this anode side separator 13, one of which surrounds each of the inlet side fuel gas through hole 22a, the inlet side oxidizing gas through hole 23a, the inlet side cooling medium through hole 24a, the outlet side cooling medium through hole 24b, the outlet side fuel gas through hole 22b, and the outlet side oxidizing gas through hole 23b; and sealing members S2 are fitted in these grooves 39. It should be noted that, in FIG. 3, the positions where the sealing members S1 and S2 contact the surface 14b of the cathode side separator 14 are shown by double dotted lines.

Moreover, referring to FIG. 5, the grooves 39 which surround the inlet side fuel gas through hole 22a and the outlet side fuel gas through hole 22b are formed so as respectively to surround the fuel gas communication conduits 32 and the fuel gas communication conduits 33. Furthermore, as shown in FIG. 3, the grooves 39 which surround the inlet side oxidizing gas through hole 23a and the outlet side oxidizing gas through hole 23b are formed so as respectively to surround the oxidizing gas communication conduits 27 and the oxidizing gas communication conduits 29 of said cathode side separator 14.

According to this structure, when a plurality of these fuel cells N are layered together so that the surface 14b of each cathode side separator 14 is pressed against the surface 13b of the adjacent anode side separator 13, respective sealing members S1 and S2 on the side of the anode side separator 13 around the peripheries of the inlet side fuel gas through hole 22a, the outlet side fuel gas through hole 22b, the inlet side cooling medium through hole 24a, the outlet side cooling medium through hole 24b, the inlet side oxidizing gas through hole 23a, and the outlet side oxidizing gas through hole 23b, and around the periphery of the branching flow grooves 35, are pressed against the surface 14b of the cathode side separator 14. As a result, the liquid-tight sealing together of the anode side separator 13 and the cathode side separator 14 is reliably assured.

Figure 7:
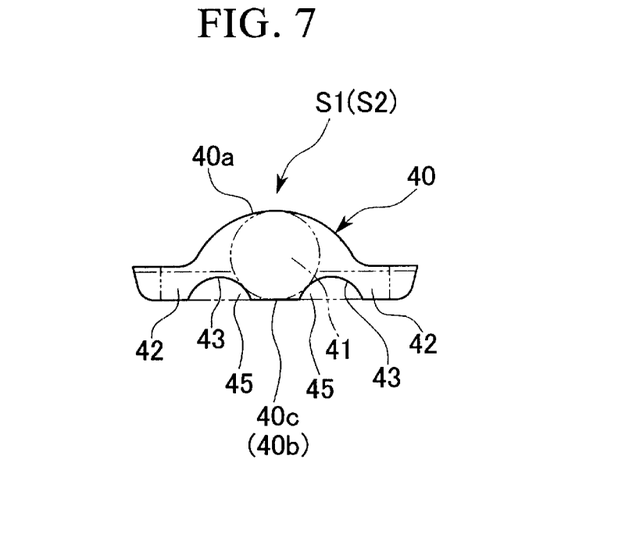
FIG. 7 is a sectional view of a sealing member according to the preferred embodiment of the present invention shown in FIG. 8, taken in a sectional plane shown by the arrows X5—X5.
Figure 8:
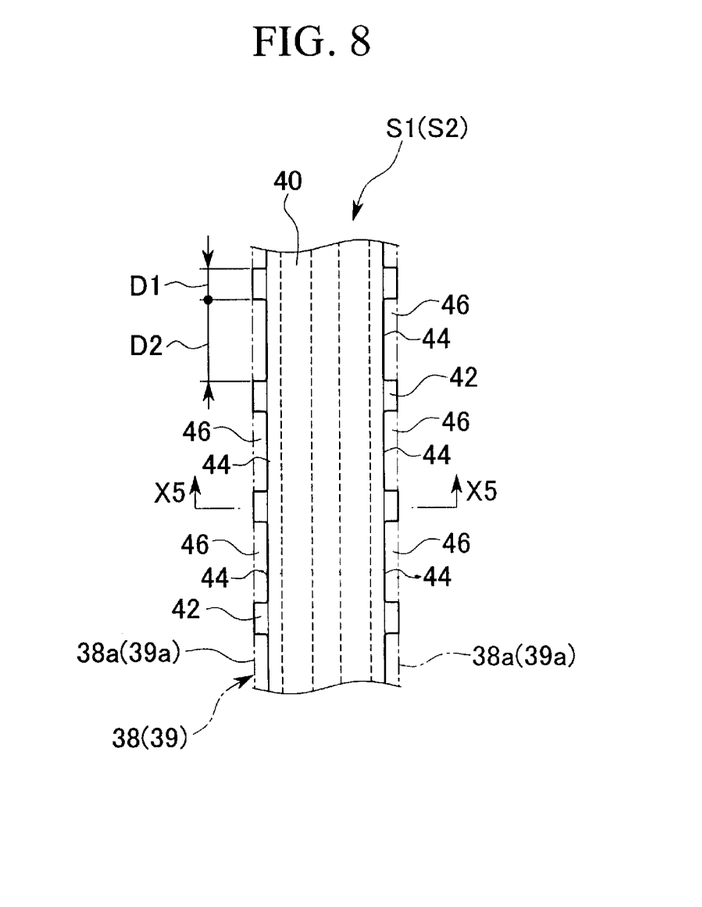
FIG. 8 is a plan view of the sealing member according to the preferred embodiment of the present invention.

Next, the sealing members S1 and S2 will be explained with reference to FIGS. 7 and 8. Here, since this sealing member S1 and sealing member S2 have the same cross sectional shape and are made from the same material although their sizes are different, the sealing member S1, which surrounds the oxidizing gas flow grooves 25, the fuel gas flow grooves 30, the branching flow grooves 35, and the like, will be explained as a representative example. It should be understood that FIG. 8 is a plan view of a portion of the sealing member S1, while FIG. 7 is a sectional view taken in a sectional plane shown by the arrows X5—X5 in FIG. 8.

The sealing member S1 is made from siliconized rubber, fluorinated rubber, ethylene propylene rubber, butyl rubber or the like, and comprises a sealing member main body 40 whose sectional shape is roughly semi-circular. Upon the upper surface of this sealing member main body 40 there is formed an arcuate portion 40a, while upon its lower surface there is formed a flat chord portion 40b.

As shown by the broken lines, a core portion 41 of circular cross sectional shape which generates sealing pressure is ensured upon the central portion of the sealing member main body 40. It should be noted that it would also be acceptable for this core portion 41 to be of elliptical cross sectional shape.

Projecting portions 42 are provided upon both the sides of the sealing member main body 40 which extend outwards in the widthwise direction of the groove 38. The ends of these projecting portions 42 are formed in arcuate shapes which match the shapes of the outer walls 38a of the groove 38, and these projecting portions 42 project as far as positions which contact (or neighbor) these groove side walls 38a.

Furthermore, a pair of cutaway portions 43 are formed in symmetrical positions about the center of the chord portion 40b. Since these cutaway portions 43 are cut away in semicircular cross sectional shapes towards the arcuate portion 40a of the sealing member main body 40, the cutaway depth of these cutaway portions 43 is formed in the depth dimension so as to be received within the depth dimension of the groove 38. Accordingly, void portions are defined between the cutaway portions 43 and the bottom surface of the groove 38. Furthermore, a flat bottom portion (sealing surface) 40c comes to be defined on the chord portion 40b between the two above described cutaway portions 43. It should be understood that the cross sectional shape of these cutaway portions 43 is not restricted to being semicircular; it only needs to be a smooth curved shape.

Figure 9:
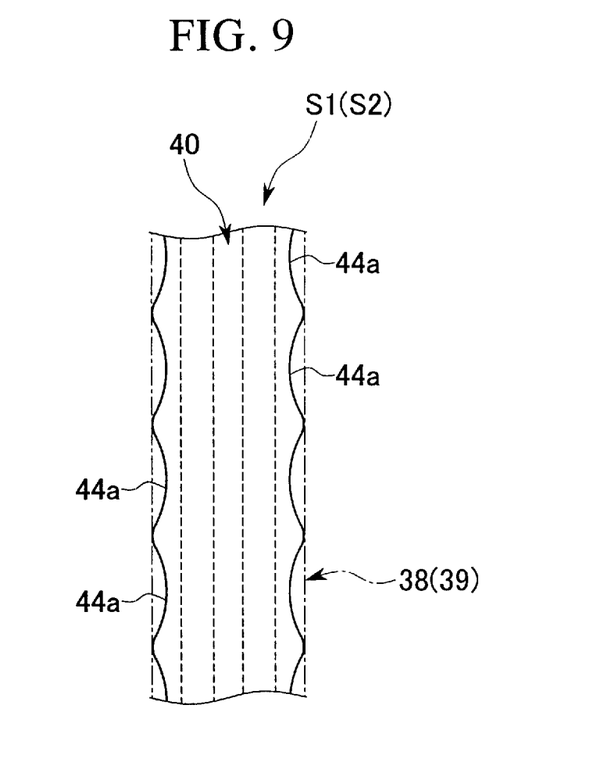
FIG. 9 is a plan view corresponding to FIG. 8, showing another preferred embodiment of the present invention.

As shown in FIG. 8, along the direction of said projecting portions 42 which lies along the length direction of the groove 38, there are formed cutaway portions 44 (of widthwise dimensions D2) at predetermined intervals, and between these cutaway portions 44 there remain outstanding projecting portions 42 of widthwise dimensions D1. By this structure, void portions 46 are defined between the cutaway portions 44 and the side walls 38a of the groove 38. Moreover, as shown in FIG. 9, by forming the cutaway portions 44 in an arcuate shape, it is possible for the profiles as seen in plan view of the projecting portions 42 to be deformed smoothly into a wave shape.

Figure 10:
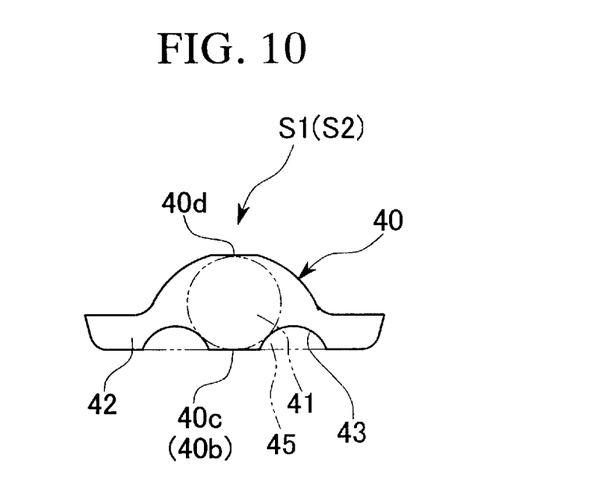
FIG. 10 is a sectional view of a sealing member according to another preferred embodiment of the present invention.

FIG. 10 shows a variation of the above described structure, in which a flat portion 40d is provided upon the arcuate portion 40a of the sealing member main body 40. This flat portion 40d is formed of the same widthwise dimension as that of the bottom portion 40c, so that applied pressure can reliably be transmitted to the bottom portion 40c. It should be understood that in FIGS. 9 and 10, to portions which correspond to portions of the structure shown in FIGS. 7 and 8, the same reference symbols are affixed, and the description thereof is curtailed in the interests of brevity.

The operation of the fuel cell with this structure will now be explained.

Along with hydrogen gas which serves as fuel gas being supplied to the fuel cell N shown in FIG. 1, air which serves as an oxidizer is also supplied. Moreover, a supply of the cooling medium is also provided, in order to cool the reaction surfaces of both the electrodes.

As shown in FIGS. 4 and 5, the hydrogen gas which has been supplied to the inlet side fuel gas through hole 22a of the fuel cell passes from the side of the surface 13b via the fuel gas communication conduits 32 to the surface 13a, and is supplied into the fuel gas flow grooves 30 which are formed upon this surface 13a.

The fuel gas which is being supplied to the fuel gas flow grooves 30 works its way in the vertical direction while meandering in the horizontal direction along the surface 13a of the anode side separator 13. At this time, the gas which contains hydrogen in the fuel gas is supplied as shown in FIG. 1 via the anode side porous conductor 18 to the anode side electrode catalytic layer 16. And the unused fuel gas, while on the one hand being supplied to the anode side electrode catalytic layer 16 while working its way along the fuel gas flow grooves 30, is also directed into the fuel gas communication conduits 33 via the fuel gas flow grooves 31, and, after arriving at the surface 13b, is expelled through the outlet side fuel gas through hole 22b.

Furthermore, the air which is supplied to the inlet side oxidizing gas through hole 23a of the fuel cell, as shown in FIG. 3, is fed to the oxidizing gas flow grooves 25 via the oxidizing gas communication conduits 27 which are connected to the inlet side oxidizing gas through hole 23a of the cathode side separator 14. This air which is being supplied to the oxidizing gas flow grooves 25 works its way in the vertical direction while meandering in the horizontal direction. At this time, the gas which contains oxygen in this air is supplied as shown in FIG. 1 from the cathode side porous conductor 19 to the cathode side electrode catalytic layer 17. And the unused oxidizing gas, while on the one hand being supplied to the cathode side electrode catalytic layer 17 while working its way along the oxidizing gas flow grooves 25, is also directed into the oxidizing gas communication conduits 29 via the oxidizing gas flow grooves 26, and, after arriving at the surface 14b, is expelled through the outlet side oxidizing gas through hole 23b. Due to the above described fuel and oxidizer flows, the fuel cell N generates electricity, which may for example be supplied to an electric motor not shown in the figures for powering it.

Furthermore, the cooling medium which is supplied to the fuel cell, after entering through the inlet side cooling medium through hole 24a, is supplied to the main flow groove 34a on the side of the surface 13b of the anode side separator 13 via the cooling medium communication conduits 36, as shown in FIG. 5. This cooling medium flow branches out from this main flow groove 34a into the plurality of branching flow grooves 35, and, after cooling the reacting surfaces of the fuel cell, comes together again in the main flow groove 34b. And after use the cooling medium is expelled via the cooling medium communication conduit 37 out from the outlet side cooling medium through hole 24b.

During this process, the projecting portion 15a of the solid polymer electrolyte membrane 15 is securely sealed against the sides of the anode side separator 13 and the cathode side separator 14, with no possibility of slippage, by the sealing members S1 and S2 which are closely contacted to this projecting portion 15a of the solid polymer electrolyte membrane 15. Furthermore, in the same manner, the peripheries of the branching flow grooves 35 on the surface 13b of the anode side separator 13 are also reliably sealed by the sealing member S1. Moreover, the peripheries of the various through holes 22a, 22b, 23a, 23b, 24a, and 24b are also securely sealed by the sealing members S2.

In other words, since the ends of the projecting portions 42 which are provided upon the sealing members S1 and S2 are prevented from movement by the side walls 38a and 39a of the grooves 38 and 39, the positions of the sealing members S1 and S2 are accurately fixed by the central portions in the widthwise direction of the grooves 38 and 39. As a result, for example, when the solid polymer electrolyte membrane 15 is pinched by the sealing members S1, it is possible for these sealing members S1 to seal against said solid polymer electrolyte membrane 15 with no possibility of slippage.

Accordingly, no leakage of fuel gas or of oxidizing gas can occur from between the sealing member S1 and the solid polymer electrolyte membrane 15 to the exterior, and therefore it is possible to enhance the sealing performance of the fuel cell N.

Furthermore, at the portions which are tightly contacted by each of the various ones of the sealing members S2 as well, since the positions of these sealing members S2 are accurately fixed by the central portions in the widthwise direction of the grooves 39. Thereby it is possible to prevent the oxidizing gas, the fuel gas, and the cooling medium from leaking from between the anode side separator 13 and the cathode side separator 14 to the exterior from the inlet side or the outlet side fuel gas through hole 22a or 22b, from the inlet side or the outlet side oxidizing gas through hole 23a or 23b, or from the inlet side or the outlet side cooling medium through hole 24a or 24b. Thus, it is possible to enhance the sealing performance.

Moreover, since the pair of cutaway portions 43 are formed at positions upon the chord portion 40b which are symmetrical about its center, thereby, if pressure acts from the arcuate portion 40a, the portions the portions which are pressed out by elastic deformation due to this pressure can be released to the void portions 45 which are defined between the grooves 38, 39 and the cutaway portions 43. Accordingly, along with making it possible to ensure a relatively great amount of elastic deformation of the sealing members S1 and S2 with a relatively small applied pressure, it is also possible to moderate the surface pressure which is required to ensure this amount of elastic deformation.

Accordingly, when a plurality of these fuel cells N are layered together into a superimposed assembly, it is possible to reduce the overall pressing force which is required as compared with the prior art, and it is possible to make the fastening mechanism smaller and lighter. Furthermore, since the height dimension of the sealing members S1 and S2 is largely set by these cutaway portions 43 and it is possible to ensure a sufficient amount of elastic deformation, thereby it will be appropriate for the depth dimension of the grooves 38 and 39 to be made to be extremely small, and for the diameter of the core portions 41 of the sealing members S1 and S2 to be made to be less than or equal to 1 mm.

In addition, by providing the cutaway portions 44 in the sealing members S1 and S2, the portions of the sealing members S1 and S2 which are deformed by the above described pressure can be released by the void portions 46 which are defined between these cutaway portions 44 and the side walls 38a, 39a of the grooves 38, 39. Therefore, it is possible to ensure a relatively great amount of elastic deformation, and it is possible to moderate the surface pressure which is required to ensure this amount of elastic deformation to a further extent. Accordingly, it is possible to set the height dimension of the sealing members S1 and S2 to be relatively great, and to ensure a sufficient amount of elastic deformation, while making the depth dimension of the grooves 38 and 39 extremely small. It should be noted that, since the greater that the widthwise dimension D2 is set with respect to the widthwise dimension D1, the smaller does the area of the projecting portions 42 which contact the side walls 38a and 39a of the grooves 38 and 39 become. Therefore, along with making it possible to enhance the ease of working when fitting the sealing members S1 and S2 into the grooves 38 and 39, it also becomes possible to reduce the amount of deformation in the widthwise direction of the grooves 38 and 39.

Furthermore, when the provision of a flat portion 40d upon the arcuate portion 40a of the sealing member main body 40 of the type shown in FIG. 10, it is possible to act the pressure more securely upon the bottom portion 40c on the under sides of the sealing members S1, S2 due to the provision of this flat portion 40d, in cooperation with the sealing members S2 and S2 being supported more stably in position due to this flat bottom portion 40c.

It should be understood that the present invention is not to be considered as being limited to its preferred embodiment as disclosed above; for example, it would be also possible to apply the present invention to a sealing member for use with separators made of a metallic material. Furthermore, it is also possible for the cutaway portions to be formed in various shapes; for example, it is possible to form the shapes of the projecting portions 42 which contact the grooves 38 and 39 by the cutaway portions 44 to be of triangular shape as seen in plan view. In this case, it is possible to reduce the initial surface pressure upon the side walls 38a and 39a of the grooves 38 and 39.

What is claimed is:

1. A sealing member for a fuel cell which comprises a pair of electrodes which sandwich an electrolyte membrane on both its sides, and a pair of separators which sandwich said electrolyte membrane on both its outer sides,
   wherein, said sealing member being formed, in cross section, with a pair of cutaway portions in symmetrical positions with respect to the center of a chord portion of a generally semicircular shaped sealing member main body.

2. A fuel cell sealing member according to claim 1, wherein said sealing member is installed into a groove in one of said separators.

3. A fuel cell sealing member according to claim 2, wherein projecting portions are provided on both sides of said chord portion extending in the widthwise direction of said groove, and said projecting portions extend to positions which adjoin or contact side walls of said groove.

4. A fuel cell sealing member according to claim 2, wherein cutaway portions are formed upon said projecting portions at predetermined intervals in the lengthwise direction of said groove.

5. A fuel cell sealing member according to claim 1, wherein cutaway portions are formed upon said projecting portions at predetermined intervals in the lengthwise direction of said groove.

* * * * *